(12) United States Patent
Watanabe et al.

(10) Patent No.: US 7,657,145 B2
(45) Date of Patent: Feb. 2, 2010

(54) METHOD FOR FABRICATION OF MULTILAYERED OPTICAL WAVEGUIDE STRUCTURE AND MULTILAYERED OPTICAL WAVEGUIDE STRUCTURE

(75) Inventors: Emi Watanabe, Neyagawa (JP); Kouhei Ogura, Neyagawa (JP); Takumi Yoshida, Tokyo (JP); Hiroaki Okano, Tokyo (JP); Shuji Suzuki, Tokyo (JP)

(73) Assignees: Nippon Paint Co., Ltd., Osaka (JP); Hirose Electric Co., Ltd., Tokyo (JP)

( * ) Notice: Subject to any disclaimer, the term of this patent is extended or adjusted under 35 U.S.C. 154(b) by 41 days.

(21) Appl. No.: 11/711,093

(22) Filed: Feb. 27, 2007

(65) Prior Publication Data

US 2007/0201803 A1 Aug. 30, 2007

(30) Foreign Application Priority Data

Feb. 28, 2006 (JP) ............................... 2006/051950

(51) Int. Cl.
*G02B 6/10* (2006.01)
(52) U.S. Cl. ...................... 385/129; 385/131
(58) Field of Classification Search ............... 385/129, 385/131
See application file for complete search history.

(56) References Cited

U.S. PATENT DOCUMENTS

| 6,624,077 B2* | 9/2003 | White ........................ 438/692 |
| 2005/0002629 A1* | 1/2005 | Okamoto et al. ............ 385/129 |
| 2005/0238278 A1* | 10/2005 | Nakashiba et al. ............ 385/14 |

FOREIGN PATENT DOCUMENTS

| JP | 11-183747 A | 7/1999 |
| JP | 2004-333883 A | 11/2004 |
| JP | 2005-17816 | 1/2005 |

* cited by examiner

*Primary Examiner*—Sarah Song
(74) *Attorney, Agent, or Firm*—Kubovcik & Kubovcik (57) ABSTRACT

A method for fabrication of a multilayered optical waveguide structure which includes at least two substrates, and an optical waveguide layer disposed between the substrates and having at least one core region and side cladding regions laterally succeeding from the core region. The method is characterized in that the optical waveguide layer is formed from a polysilane compound containing polysilane, and it comprises stacking a first block including one of the substrates and a second block including the other of the substrates through the optical waveguide layer or a cladding layer located at a surface of either one of the blocks, and heating them while pressed in such arrangement so that the first block and the second block are bonded together by the optical waveguide layer or the cladding layer serving as a bonding layer into the multilayered structure.

28 Claims, 3 Drawing Sheets

METHOD FOR FABRICATION OF MULTILAYERED OPTICAL WAVEGUIDE STRUCTURE AND MULTILAYERED OPTICAL WAVEGUIDE STRUCTURE

BACKGROUND OF THE INVENTION

1. Field of the Invention

The present invention relates to a fabrication method of a multilayered optical waveguide structure which has an optical waveguide layer formed from a polysilane composition containing polysilane, and also to a multilayered optical waveguide structure fabricated by this method.

2. Description of the Related Art

A polymer optical waveguide having a core layer and a surrounding cladding layer, each made of a polymer, can be supplied in a large sectional area and fabricated by a simple technique and at low cost. Because of such advantages, its practical application has been expected. Japanese Patent Laid-Open No. 2004-333883 proposes a polymer optical waveguide having a core layer and a cladding layer both made of a polysilane compound.

In the field of optical waveguides, they are used in combination with a multicore optical fiber ribbon. This has led to a demand for an optical waveguide which consists of plural superimposed optical wirings. Japanese Patent Laid-Open No. Hei 11-183747 discloses a method wherein polymer optical waveguide films are laminated using a double-sided adhesive sheet to make a three-dimensional polymer optical waveguide array.

In Japanese Patent Laid-Open No. 2005-17816, a method is disclosed in which a curable resin for a cladding, i.e., a UV-curing resin is used as an adhesive to bond plural waveguide films.

However, the method disclosed in Japanese Patent Laid-Open No. Hei 11-183747 needs a separate, double-sided adhesive sheet for bonding the polymer optical waveguide films, which increases a thickness of the laminate to problematically prevent reduction of a weight and a size thereof. Also, release sheets must be removed from the double-sided adhesive sheet in order to sequentially bond the polymer optical waveguide films. This increases a complexity of the fabrication method, making it unsuitable for practical application.

In the method disclosed in Japanese Patent Laid-Open No. 2005-17816 which uses a liquid-form UV-curing resin as an adhesive, it is required that the UV-curing resin be first applied onto any of polymer optical waveguide films and, after they are bonded together, exposed to an ultraviolet light to cure the resin. This raises a problem of an increased complexity of the fabrication method. Also, this UV-curing resin is used as a cladding layer. Unless the UV-curing resin is applied properly, the resulting poor adhesion thereof to a core layer results in the problematic formation of air gaps between the core layer and the cladding layer.

SUMMARY OF THE INVENTION

It is an object of the invention to provide a fabrication method which enables ready fabrication of a multilayered optical waveguide structure including substrates and an optical waveguide layer disposed between them, and a multilayered optical waveguide structure fabricated by this method.

A fabrication method in accordance with a first aspect of the present invention is for fabrication of a multilayered optical waveguide structure which includes at least two substrates and at least one optical waveguide layer disposed between the substrates and having at least one core region and side cladding regions laterally succeeding from the core region. The method is characterized in that the optical waveguide layer is formed from a polysilane compound containing polysilane; and it comprises stacking a first block including one of the substrates and a second block including the other of the substrates through the optical waveguide layer located at a surface of either one of the blocks, and heating them while in such arrangement so that the first block and the second block are bonded together by the optical waveguide layer serving as a bonding layer into the multilayered structure.

A fabrication method in accordance with a second aspect of the invention is for fabrication of a multilayered optical waveguide structure which includes at least two substrates, an optical waveguide layer having at least one core region and side cladding regions laterally succeeding from the core region, and a cladding layer provided on at least one surface of the optical waveguide layer, with the optical waveguide layer and the cladding layer being disposed between said substrates. The method is characterized in that the optical waveguide layer and/or the cladding layer is formed from a polysilane compound containing polysilane; and it comprises stacking a first block including one of the substrates and a second block including the other of the substrates through the optical waveguide layer or the cladding layer located at a surface of either one of the blocks, and heating them while in such arrangement so that the first block and the second block are bonded together by the optical waveguide layer or the cladding layer serving as a bonding layer into the multilayered structure.

The matters in common with the first and second aspects of the present invention are hereinafter referred to as those of the "present invention".

The optical waveguide layer in the present invention is formed from a polysilane compound containing polysilane. The core region and the side cladding region in the optical wiring layer are preferably formed as a result of exposure of a region corresponding to the side cladding region to an ultraviolet light. By exposure to an ultraviolet light, the exposed region is rendered lower in refractive index than the unexposed region to form the side cladding region and the unexposed region remains as the core region. In the formation of the side cladding region, the ultraviolet irradiation induces an Si—Si bond in polysilane to change its form to a Si—O—Si bond and, as a result, lowers a refractive index of the region.

In the present invention, the cladding layer provided on a face of optical waveguide layer is also formed from the polysilane compound containing polysilane. Preferably, the cladding layer is formed as a result of reduction of its refractive index by exposure to an ultraviolet light, as similar to the side cladding region.

In the present invention, the thickness of the optical waveguide layer or cladding layer is not particularly specified but generally in the range of 10 μm -100 μm.

Preferably, the ultraviolet light having a wavelength of 250-400 nm is used. Exposure dosage is preferably 0.1-10 J/cm², more preferably 0.1-1 J/cm², per 1 μm thickness of the optical waveguide layer.

In the present invention, it is preferred that, following formation of the side cladding region, the optical waveguide layer is subjected to a heat treatment. Also in the case where the cladding layer is formed from the polysilane composition, a heat treatment is preferably performed. A heat treatment temperature is preferably in the range of 100-350° C. Such heat treatment stabilizes the optical waveguide layer by inducing crosslinking and rendering it insensitive to light.

The polysilane composition in the present invention preferably contains polysilane and a silicone compound. In this case, a blending ratio (polysilane:silicone compound) by mass of the polysilane and silicone compound is preferably in the range of 5:95-80:20. If the amount of the polysilane falls below this range, interlayer adhesion may become insufficient. On the other hand, if the amount of the polysilane goes beyond this range, cracking may occur.

In the present invention, the polysilane composition may further contain an organic peroxide. In particular, the polysilane composition forming the optical waveguide layer preferably contains an organic peroxide. If the organic peroxide is contained, oxygen can be supplied from the organic peroxide to the polysilane when the side cladding region is formed as a result of photobleaching by ultraviolet irradiation. This eases conversion of the Si—Si bond to the Si—O—Si bond.

The organic peroxide is preferably contained in the amount of 10-30 parts by mass, more preferably 5-20 parts by mass, based on 100 parts by mass of the aforementioned polysilane and silicone compound. If the loading of the organic peroxide is excessively lower than this range, it may become difficult to perform short-time and uniform photobleaching that forms the side cladding region. On the other hand, if the loading of the organic peroxide is excessively high, an optical propagation loss of the resulting optical waveguide may increase.

Fine particles, such as of silica, which do not scatter a light and have a particle diameter of not exceeding 200 nm may be contained in the polysilane composition in the amount of 1-30% by mass of polysilane, for the purpose of providing a film property improvement.

In the present invention, the optical waveguide layer or cladding layer formed of the polysilane composition is utilized as a bonding layer to bond the first block including one of the substrates and the second block including the other one of the substrates in a face-to-face relationship. Preferably, in bonding these first and second blocks, they are heated in the 60-350° C. temperature range. The excessively low or high heating temperature increases the occurrence of poor adhesion that lowers reliability.

More preferably, in joining those first and second blocks, they are heated while pressed against each other. Preferably, a pressure in the range of 1 K-100 MPa is applied to the blocks. Application of the excessively low pressure may cause wiring misalignment between layers or result in the failure to provide uniform adhesion. The poor adhesion lowers reliability. On the other hand, application of the excessively high pressure renders those blocks more susceptible to deformation, resulting in the difficulty to secure uniform dimensions.

Also in the present invention, joining of the first and second blocks is preferably performed in a reduced-pressure process atmosphere. Bonding thereof is further eased when performed under the reduced-pressure condition. Preferably, the reduced-pressure condition does not exceed 133 Pa. A vacuum pressure is more preferred.

The fabrication method of the present invention can be utilized to fabricate a multilayered optical waveguide structure which includes plural optical waveguide layers stacked one above the other. It is accordingly preferred in the present invention that a block having one or more optical waveguide layers and a block either having a single optical waveguide layer or no optical waveguide layer are joined together.

Specific embodiments which can be utilized in the present invention to laminate plural optical waveguide layers are below described.

(1) Plural blocks each having an optical waveguide layer preformed on a substrate are provided. These blocks are stacked in a pile. The stacked blocks are then heated (under pressure, when necessary) so that those blocks are simultaneously joined together into a multilayered structure.

(2) Plural blocks each having an optical waveguide layer preformed on a substrate are provided. These blocks are sequentially bonded to pile them up into a multilayered structure.

(3) A substrate alone is bonded onto a block having an optical waveguide layer preformed on a substrate. An optical waveguide layer and/or a cladding layer is formed on the substrate overlying the block. Another substrate is then joined onto the waveguide layer and/or cladding layer, followed by formation of an optical waveguide layer on the bonded substrate. This process is repeated to form optical waveguide layers while stacking them one above the other.

In the present invention, in the case where a substrate is provided on at least one face of the optical waveguide layer, the substrate can be provided as a cladding layer. In this case, a material having a lower refractive index than the core region is used for the substrate.

In accordance with the present invention, the optical waveguide layer or cladding layer, each formed from the polysilane composition, is utilized as a bonding layer. The blocks including substrates are arranged above each other through the optical waveguide layer or cladding layer and heated while in such arrangement, so that they are bonded together into a multilayered structure. The use of the waveguide layer or cladding layer as the bonding layer eliminates the need of a separate bonding member. This accordingly simplifies a fabrication process and achieves reduction in weight and size of the multilayered optical waveguide structure.

BRIEF DESCRIPTION OF THE DRAWINGS

FIG. 1 diagrammatically shows a sectional view which shows an embodiment of a fabrication process in accordance with the present invention.

FIG. 2 diagrammatically shows a sectional view which shows another embodiment of a fabrication process in accordance with the present invention.

FIG. 3 diagrammatically shows a sectional view which shows a further embodiment of a fabrication process in accordance with the present invention.

DESCRIPTION OF THE PREFERRED EXAMPLES

The polysilane, silicone compound, organic peroxide, polysilane composition and substrate for use in the present invention are now described.

(Polysilane)

Polysilane, either linear or branched, may be used in the present invention. However, the use of branched polysilane is particularly preferred. Linear and branched polysilanes are distinguished from each other by a binding state of a Si atom contained in polysilane. The branched polysilane refers to polysilane containing a Si atom with the number of bonds (binding number) to neighboring Si atoms being 3 or 4. On the other hand, the linear polysilane contains a Si atom with the number of bonds to neighboring Si atoms being 2. Because a Si atom normally has a valence of 4, the Si atom having the binding number of 3 or less, if present among Si atoms in polysilane, is bound to a hydrocarbon group, an alkoxy group or a hydrogen atom, as well as to neighboring Si atoms. The preferred hydrocarbon group is an aliphatic hydrocarbon group having a carbon number of 1-10, either substituted or unsubstituted with halogen, or an aromatic hydrocarbon group having a carbon number of 6-14. Specific examples of aliphatic hydrocarbon groups include chain hydrocarbon groups such as methyl, propyl, butyl, hexyl, octyl, decyl, trifluoropropyl and nonafluorohexyl groups; and alicyclic hydrocarbon groups such as cyclohexyl and methylcyclohexyl groups. Specific examples of aromatic hydrocarbon groups include phenyl, p-tolyl, bi-phenyl and anthracyl groups. The alkoxy group may have a carbon number of 1-8. Specific examples of such alkoxy groups include methoxy, ethoxy, phenoxy and octyloxy. If easy synthesis is considered, methyl and phenyl groups are particularly preferred among them. The refractive index can be adjusted by suitable selection of particular polysilane structures. When a high refractive index is desired, a diphenyl group may be introduced. On the other hand, when a lower refractive index is desired, a dimethyl content may be increased.

Preferably, Si atoms having 3 or 4 bonds to neighboring Si atoms constitute at least 2% of a total number of Si atoms present in the branched polysilane. Because the branched polysilane containing less than 2% of such Si atoms and the linear polysilane are both highly crystalline, the use of such highly crystalline polysilanes likely results in the production of microcrystallites in a film. This causes light scattering and lowers transparency.

The polysilane for use in the present invention can be produced by a polycondensation reaction that occurs when a halogenated silane compound is heated in an organic solvent such as n-decane or toluene, under the presence of sodium or any other alkaline metal, to 80° C. or above. Other applicable synthesis methods include an electrolytic polymerization method and a method using metallic magnesium and metal chloride.

The branched polysilane within the purpose of the present invention can be obtained by thermal polycondensation of a halosilane mixture containing an organotrihalosilane compound, a tetrahalosilane compound and a diorganodihalosilane compound, wherein the organotrihalosilane and tetrahalosilane compounds are present in the amount of at least 2 mole %, based on the total amount of the halosilane mixture. In this case, the organotrihalosilane compound serves as a source of Si atoms having 3 bonds to neighboring Si atoms and the tetrahalosilane compound serves as a source of Si atoms having 4 bonds to neighboring Si atoms. The network structure can be identified such as by measurement of an ultraviolet absorption spectrum or a nuclear magnetic resonance spectrum for silicon.

Preferably, the respective halogen atoms in the foregoing organotrihalosilane compound, tetrahalosilane compound and diorganodihalosilane compound, for use as raw material of polysilane, are all chlorine atoms. Other than halogen atoms, the organotrihalosilane compound and diorganodihalosilane compound may have a substituent group, examples of which include the aforementioned hydrocarbon group, alkoxy group and hydrogen atom.

The branched polysilane is not particularly specified in type, so long as it is soluble in an organic solvent and can be coated to form a transparent film. Examples of suitable organic solvents include hydrocarbons having a carbon number of 5-12, halogenated hydrocarbons and ethers.

Examples of such hydrocarbons include pentane, hexane, heptane, cyclohexane, n-decane, n-dodecane, benzene, toluene, xylene and methoxybenzene. Examples of halogenated hydrocarbons include carbon tetrachloride, chloroform, 1,2-dichloroethane, dichloromethane and chlorobenzene. Examples of ethers include diethyl ether, dibutyl ether and tetra-hydrofuran.

The use of the branched polysilane with a higher branching coefficient results in the higher light transmittance, provided that it has a branching coefficient of at least 2%. Deuterated and partially or wholly halogenated, particularly fluorinated, branched polysilanes can also be used.

(Silicone Compound)

A specific example of the silicone compound for use in the present invention is the one represented by the following chemical formula (1) or (2).

(In the formula, $R_1$-$R_{20}$ are independently a group selected from the group consisting of an aliphatic hydrocarbon group having a carbon number of 1-10, either substituted or unsubstituted with a halogen or an acryl, methacryl, glycidyl or glycidyloxy group, an aromatic hydrocarbon group having a carbon number of 6-12 and an alkoxy group having a carbon number of 1-8; they may be identical or different from each other; and a-g are independently an integer inclusive of 0 and satisfy $a+b+c+d \geqq 1$ and $e+f+g \geqq 1$).

More specifically, the silicone compound represented by the chemical formula (1) results, for example, from hydrolytic condensation of dichlorosilane having two organic substituents, called a D-structure, and trichlorosilane having one organic substituent, called a T-structure, either with or without one or more other complementary components. An example of the silicone compound represented by the chemical formula (2) is a linear silicone comprised mainly of the less branched D-structure obtained as a result of ring-opening polymerization of cyclic siloxane as a starting material.

Specific examples of aliphatic hydrocarbon groups for inclusion in this silicone compound include chain hydrocarbon groups such as vinyl, methyl, propyl, butyl, hexyl, octyl, decyl, trifluoropropyl and glycidyloxypropyl; and alicyclic hydrocarbon groups such as cyclohexyl and methyl-cyclohexyl. Specific examples of aromatic hydrocarbon groups include phenyl, p-tolyl and biphenyl. Specific examples of alkoxy groups include methoxy, ethoxy, phenoxy, octyloxy and ter-butoxy.

The types of the preceding $R_1$-$R_{20}$ and the values of a-g are not particularly important and thus not particularly specified, so long as the silicone compound is compatible with the polysilane and organic solvent used and together provide a transparent film. If the compatibility is of concern, the silicone compound preferably has the same hydrocarbon group as contained in the polysilane used. For example, in the case where phenylmethyl-based polysilane is used, a phenylmethyl- or diphenyl-based silicone compound is preferably used. The silicone compound having two or more of alkoxy, vinyl, acryl, methacryl, glycidyl or glycidyloxy in a molecule serves as a crosslinking agent. Examples of such silicone compounds include methylphenylmethoxy silicone and phenylmethoxy silicone, each having an alkoxy group content by weight of 15-35%.

The silicone compound having a molecular weight of not higher than 10,000, more preferably not higher than 3,000, is suitably used.

(Organic Peroxide)

The organic peroxide for use in the present invention is not particularly specified in type, so long as it is a compound which can efficiently insert oxygen into an Si—Si bond in the polysilane used, and can be illustrated by peroxy esters. In particular, benzophenone-containing organic peroxides are preferably used.

An example of the peroxide in the form of a peroxy ester is 3,3',4,4'-tetra(t-butyl peroxy carbonyl) benzophenone (hereinafter referred to as "BTTB").

(Polysilane Composition)

The polysilane composition in the present invention contains polysilane and preferably contains a silicone compound, as described above. Also, the polysilane composition used to form the optical waveguide layer preferably contains an organic peroxide, as also described above.

In the present invention, the polysilane composition is generally used in the form of a dilute solution with an aid of a solvent capable of dissolving polysilane. As such solvents, aromatic hydrocarbons such as benzene, toluene, xylene and methoxybenzene, and ether solvents such as tetrahydrofuran and dibutyl ether are suitably used. Preferably, the solvent is used in such a range that brings a polysilane concentration to 20-90% by weight.

The solution of the polysilane composition can be applied by various methods including a spin coating technique. After application, the solution of the polysilane composition is dried to form a thin film. When necessary, prebaking may be performed. A preferred prebaking temperature is approximately in the range of 80-150° C.

(Substrate)

While not particularly specified, the substrate in the present invention may be an inorganic substrate represented by a silicon wafer or glass substrate, or an organic substrate typically of polyimide or PET (polyethylene terephthalate). The organic substrate, if used, is preferably made of a material having a property to withstand a temperature applied thereto during the process, or alternatively, pretreated to have such a property.

In the case where the substrate is used as the cladding layer, as described above, this substrate has a lower refractive index than the core region of the optical waveguide layer.

EXAMPLES

The following specific examples illustrate the present invention, but are not intended to be limiting thereof.

Example 1

FIG. 1 is a sectional view which shows a fabrication process of Example 1.

Figure 1A:
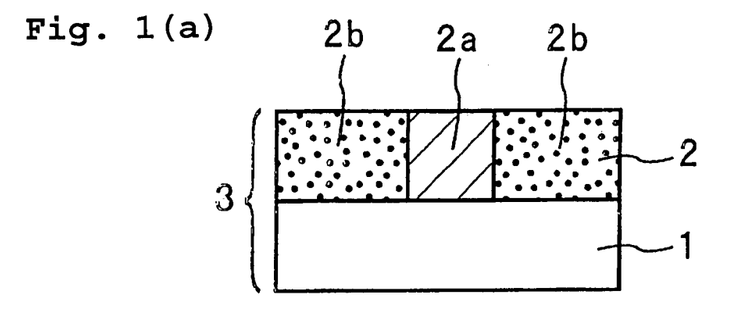

As shown in FIG. 1(a), the polysilane composition was utilized to form an optical waveguide layer 2 on one face of a substrate 1. Formation of this optical waveguide layer 2 is achieved by applying a solution of the polysilane composition, drying the applied solution to form a film of the polysilane composition and exposing a region of the film that corresponds to a side cladding region 2b to an ultraviolet light so that the exposed region is reduced in refractive index as a result of conversion of an Si—Si bond to an Si—O—Si bond. The unexposed region then constitutes a core region 2a. In this Example, the substrate 1 is used as a cladding layer. Accordingly, the substrate 1 is made of a material having a lower refractive index than the core region 2a.

A block 3 is made as a result of formation of the optical waveguide on one face of the substrate 1 in accordance with the above-outlined procedure. Accordingly, the block 3 consists of the substrate 1 and the optical waveguide layer 2.

Figure 1B:
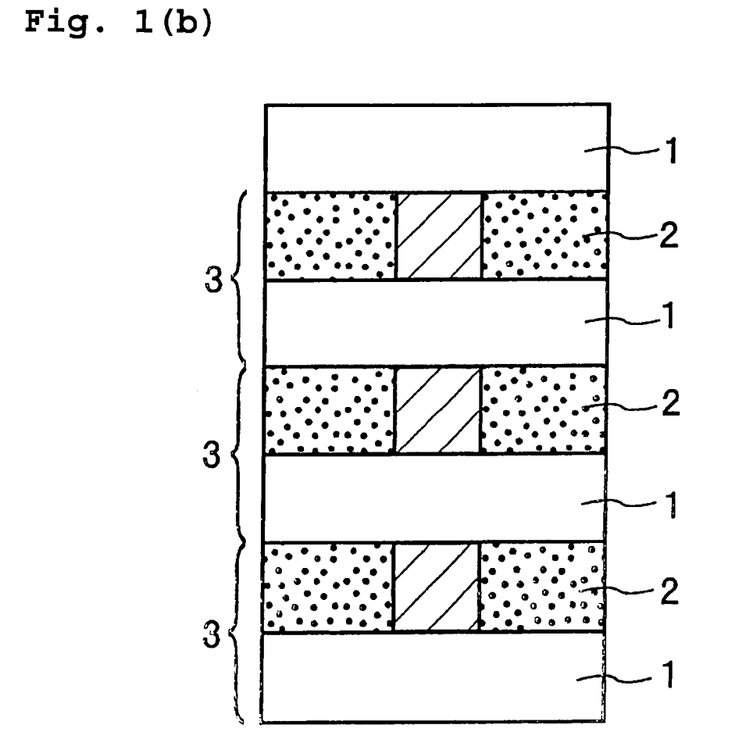

Three blocks 3, each shown in FIG. 1(a), are fabricated and then stacked one above the other as shown in FIG. 1(b). Further, a substrate 1 is placed on the optical waveguide layer 2 that defines one side of the block 3.

In such arrangement, they are heated while pressed against each other. As a result, those three blocks 3 and the substrate 1 are bonded together into a multilayered structure.

In this Example, each optical waveguide layer 2 serves as a bonding layer to bond the substrate 1 of its block 3 to a separate substrate 1, resulting in a multilayered structure.

A 0.2 mm thick glass plate is used as the substrate 1. The polysilane composition used to form the optical waveguide layer 2 contains 60 parts by mass of branched polymethylphenylsilane, 30 parts by mass of a silicone compound (product name "DC 3074", product of Toray-Dow Corning Silicone Co., Ltd.) and 10 parts by mass of BTTB (product of NOF Corp.). A solution of this polysilane composition in anisole was spin coated and then heated at 100° C. for 30 minutes, i.e., prebaked, to form a thin film. This thin film is exposed, through a mask patterned with a linear waveguide and located above the thin film, to light at a dosage of 15 J/cm$^2$ using a high-pressure mercury lamp. After exposure, the thin film is subjected to a heat treatment at 250° C. for 30 minutes to form the side cladding region.

The stacked three block 3 and the substrate 1 are pressed against each other at a pressure set at 30 KPa and heated in a reduced-pressure oven (creating a process atmosphere reduced in pressure to 10 Pa) at 250° C. for 30 minutes to achieve bonding thereof.

The branched polysilane used was the one prepared in the following Synthesis Example. The same branched polysilane was used in the below-described Examples.

(Synthesis Example of Polysilane)

400 ml of toluene and 13.3 g of sodium were charged into a 1,000 ml flask equipped with a stirrer. The flask contents were heated in an ultraviolet-shielded yellow room to 111° C. and stirred at a high speed to provide a fine dispersion of sodium in toluene. 42.1 g of phenylmethyldichlorosilane and 4.1 g of tetrachlorosilane were added to the dispersion which was then stirred for 3 hours to effect polymerization. Thereafter, ethanol was added to the reaction mixture to deactivate excess sodium. Subsequent to washing with water, a separated organic layer was introduced into ethanol to precipitate polysilane. The resulting crude polysilane was reprecipitated three times from ethanol to obtain branched polymethylphenylsilane having a weight average molecular weight of 11,600.

Example 2

In Example 1, in bonding the stacked three blocks 3 and the substrate 1, they were neither pressed against each other nor placed under reduced pressure, but heated at 250° C. under normal pressure. Otherwise, the procedure of Example 1 was followed to fabricate a multilayered optical waveguide structure.

In observing the obtained multilayered optical waveguide structure, slight optical wiringmisalignment as well as presence of some air bubbles were noticed. Accordingly, in bonding the blocks in the present invention, it has been found preferable to heat them while pressed against each other. It has been found more preferable to heat them while pressed against each other in a reduced-pressure atmosphere.

Example 3

FIG. 2 is a sectional view which shows a fabrication process of Example 3.

Figure 2A:
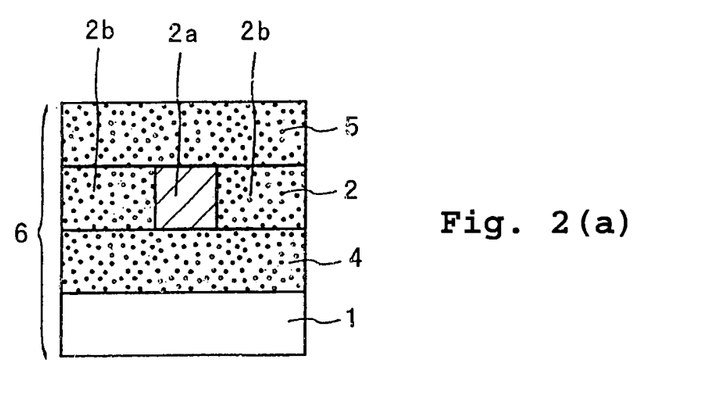

As shown in FIG. 2(a), a lower cladding layer 4 is formed on one face of the substrate 1. An optical waveguide layer 2 is formed on one face of the lower cladding layer 4. An upper cladding layer is formed to overlie a face of the optical waveguide layer 2. The substrate 1, lower cladding layer 4, optical waveguide layer 2 and upper cladding layer 5 are all made of the polysilane composition.

The substrate 1, lower cladding layer 4, optical wiring layer 2 and upper cladding layer 5 together constitute a block 6.

Figure 2B:
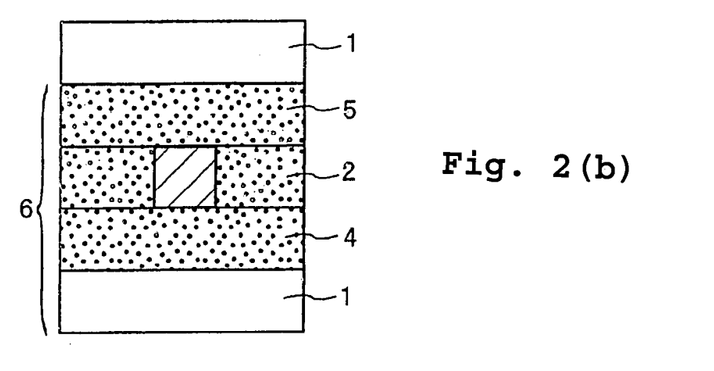

As shown in FIG. 2(b), a separate substrate 1 is placed on the block 6. In such arrangement, the substrate 1 and block 6 are bonded together in the same manner as in Example 1. When they are bonded, the upper cladding layer 5 serves as a bonding layer.

Figure 2C:
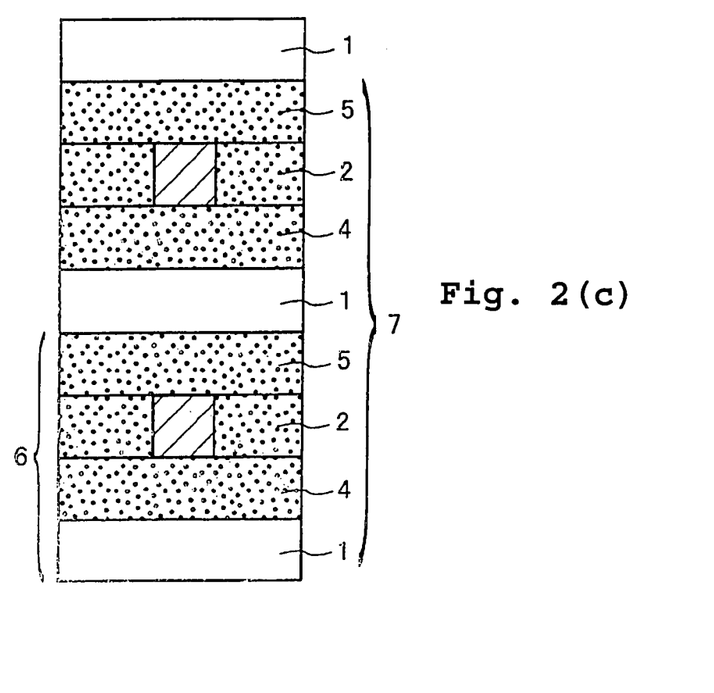

Next, a lower cladding layer 4, an optical waveguide layer 2 and an upper cladding layer 5 are sequentially formed on a face of the substrate 1 overlying the block 6, as shown in FIG. 2(c). This completes a block 7. Then, a separate substrate 1 is placed on the upper cladding layer 5 which defines one face of the block 7, as shown in FIG. 2 (c). The substrate and the block stacked in such configuration are heated while pressed, so that the separate substrate 1 and the block 7 are bonded together into a multilayered structure.

Specifically, a 1 mm thick silicon wafer is used as the substrate 1. A solution of a polysilane composition containing 50 parts by mass of branched polymethylphenylsilane and 50 parts by mass of a silicone compound (product name "TSR 165", product of GE-Toshiba Silicone Co., Ltd.) in anisole is applied onto one face of the substrate 1 by a spin coating technique and thereafter heated at 300° C. for 30 minutes to form the lower cladding layer 4.

Next, a solution of a polysilane composition containing 66 parts by mass of branched polymethylphenylsilane and 34 parts by mass of a silicone compound (TSR 165) in anisole is applied onto a face of the lower cladding layer 4 by a spin coating technique and thereafter heated at 130° C. for 30 minutes to form a thin film. This thin film is exposed, through a mask patterned with a linear waveguide and located above the thin film, to light at a dosage of 25 J/cm$^2$ using a high-pressure mercury lamp. After exposure, the thin film is subjected to a heat treatment at 300° C. for 30 minutes to form the optical waveguide layer 2. In the optical waveguide layer 2, the UV-exposed region is the side cladding region 2b and the unexposed region is the core region 2a.

Subsequently, an anisole solution of the same polysilane composition as used in the formation of the lower cladding layer 4 is applied onto a face of the optical waveguide layer 2 by a spin coating technique and thereafter heated at 300° C. for 30 minutes to form an upper cladding layer 5.

Subsequently, a separate substrate 1 is placed on the above-fabricated block 6, as shown in FIG. 2 (b). Then, the superposed block and substrate are subjected to pressing that applies a pressure of 10 KPa across them and heated in a reduced-pressure oven (creating a process atmosphere reduced in pressure to 10 Pa) at 300° C. for 30 minutes, so that the substrate 1 is bonded onto the block 6 in a face-to-face relationship.

Subsequently, the lower cladding layer 4, optical waveguide layer 2 and upper cladding layer 5 are sequentially formed on the substrate 1 overlying the block 6, according to the same process as shown in FIG. 2(a), so that the block 7 is made.

Subsequently, a separate substrate 1 is placed on a face of the upper cladding layer 5 of the above-fabricated block 7, as shown in FIG. 2(c). The block and substrate stacked in such configuration are subjected to pressing that applies a pressure 10 KPa across them and heated in a reduced-pressure atmosphere under the same conditions as described above. As a result, they are joined together into a multilayered structure.

Example 4

FIG. 3 is a sectional view which shows a fabrication process of Example 4.

Figure 3A:
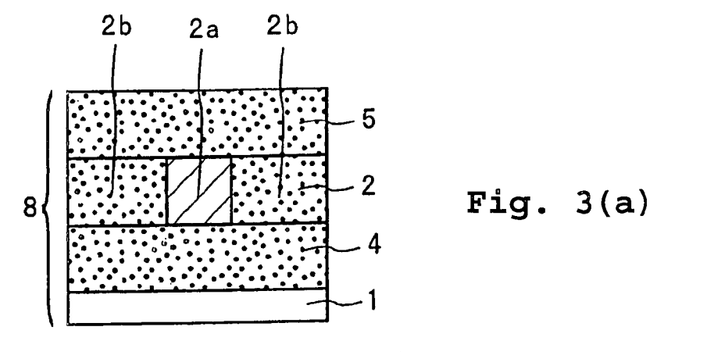

A lower cladding layer 4, an optical waveguide layer 2 and an upper cladding layer 5 are sequentially formed on one face of a film substrate 1 to make a block 8, as shown in FIG. 3(a).

Figure 3B:
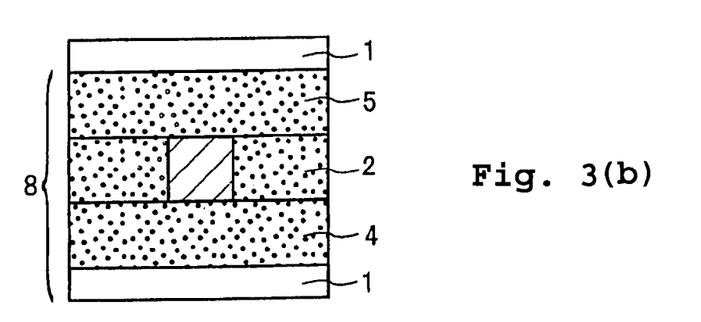

As shown in FIG. 3(b), a separate film substrate 1 is placed on a face of the upper cladding layer 5 of the block 8. Then, they are pressed and heated to thereby join the film substrate 1 onto the upper cladding layer 5 of the block 8 in a face-to-face relationship. Accordingly, the upper cladding layer 5 serves as a bonding layer.

Figure 3C:
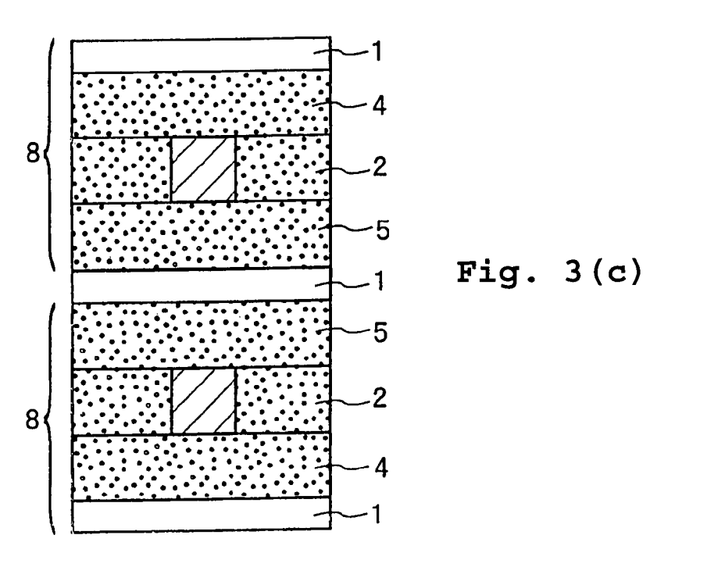

Subsequently, another block 8 is placed on the separate substrate 1 bonded to the block 8 so as for its cladding layer 5 to face toward the separate substrate, as shown in FIG. 3(c). They are pressed and heated while in such arrangement to thereby join another block 8 to the separate substrate 1 in a face-to-face relationship. Also in this case, the upper cladding layer 5 of another block 8 serves as a bonding layer.

Specifically, a 0.2 mm thick, heat-resisting polyimide film (product name "Capton", product of Dupont) is used as the film substrate 1. A solution of a polysilane composition containing 48 parts by mass of branched polymethylphenylsilane, 48 parts by mass of a silicone compound (product name "KR 2020", product of Shin-Etsu Chemical Co., Ltd.) and 4 parts by mass of BTTB (product of NOF Corp.) in anisole is applied onto the film substrate 1 by an applicator and thereafter heated at 250° C. for 30 minutes to form a lower cladding layer 4. Subsequently, a solution of a polysilane composition containing 55 parts by mass of branched polymethylphenylsilane, 35 parts by mass of a silicone compound (KR 2020) and 10 parts by mass of BTTB in anisole is applied onto the lower cladding layer 4 by an applicator and thereafter prebaked at 120° C. for 30 minutes to form a thin film. A region of this thin film that corresponds to the side cladding region is exposed, through a mask patterned with a linear waveguide and located above the thin film, to light at a dosage of 15 J/cm$^2$ using a high-pressure mercury lamp. After exposure, the thin film is subjected to a heat treatment at 250° C. for 30 minutes to form the optical wiring layer.

An anisole solution of the same polysilane composition as used in the formation of the lower cladding layer 4 is applied onto the optical waveguide layer by an applicator and thereafter heated at 250° C. for 30 minutes to form the upper cladding layer 5.

Subsequently, a separate film substrate 1 is placed on a face of the upper cladding layer 5 of the block 8, as shown in FIG. 3(b). The block and the film substrate 1 are pressed against each other at a pressure of 10 KPa and heated in a 250° C. oven for 30 minutes, so that the block 8 and the substrate 1 are bonded together in a face-to-face relationship.

Subsequently, another block 8 is placed on the substrate 1 overlying the block 8 so as for its upper cladding layer 5 face toward the substrate, as shown in FIG. 3(c). While maintained in such arrangement, they are pressed and heated in the same manner as described above to join another block 8 and the substrate 1 into the multilayered structure.

What is claimed is:

1. A method for fabrication of a multilayered optical waveguide structure which includes at least two substrates, and at least two optical waveguide layers each having at least one core region and side cladding regions laterally succeeding from the core region, one of said at least two optical waveguide layers being disposed between the substrates, comprising forming a first block by providing one of said at least two optical waveguide layers on a face of one of said at least two substrates;

forming a second block by providing another of said at least two optical waveguide layers on a face of another of said at least two substrates;

stacking said first block and said second block so that the optical waveguide layer of said first block is brought into direct contact with another face of the substrate of said second block, and heating the resultant stack of the first block and the second block while in such arrangement so that the first block and the second block are bonded together by the optical waveguide layer serving as a bonding layer to form the multilayered structure;

wherein said optical waveguide layer is formed from a polysilane composition containing polysilane.

2. The method for fabrication of a multilayered optical waveguide structure as recited in claim 1, characterized in that said side cladding region of the optical waveguide layer is toned as a result of exposure to ultraviolet light that renders the side cladding region and/or the cladding layer lower in refractive index than the unexposed core region.

3. The method for fabrication of a multilayered optical waveguide structure as recited in claim 2, characterized in that, subsequent to formation of said side cladding region, the optical waveguide layer is subjected to a heat treatment.

4. The method for fabrication of a multilayered optical waveguide structure as recited in claim 1, characterized in that said polysilane composition contains polysilane and a silicone compound.

5. The method for fabrication of a multilayered optical waveguide structure as recited in claim 4, characterized in that a blending proportion (polysilane:silicone compound) by mass of said polysilane and said silicone compound is in the range of 5:95-80:20.

6. The method for fabrication of a multilayered optical waveguide structure as recited in claim 4, characterized in that said polysilane composition further contains an organic peroxide.

7. The method for fabrication of a multilayered optical waveguide structure as recited in claim 6, characterized in that said organic peroxide is contained in the amount of 10-30 parts by mass, based on 100 parts by mass of said polysilane and silicone compound.

8. The method for fabrication of a multilayered optical waveguide structure as recited in claim 1, characterized in that, in bonding said first block and said second block into the multilayered structure, said first block and said second block are heated in the 60-350° C temperature range.

9. The method for fabrication of a multilayered optical waveguide structure as recited in claim 1, characterized in that, in bonding said first block and said second block into the multilayered structure , said first block and said second block are heated while pressed against each other.

10. The method for fabrication of a multilayered optical waveguide structure as recited in claim 9, characterized in that bonding of said first block and said second block is carried out in a reduced-pressure atmosphere.

11. The method for fabrication of a multilayered optical waveguide structure as recited in claim 9, characterized in that, in bonding said first block and said second block into the multilayered structure, said first block and said second block are pressed at a pressure of 1 kPa-100 MPa.

12. The method for fabrication of a multilayered optical waveguide structure as recited in claim 1, characterized in that said second block comprises an optical waveguide layer.

13. A multilayered optical waveguide structure fabricated by the method as recited in claim 1.

14. The method for fabrication of a multilayered optical waveguide structure as recited in claim 1, wherein said at least one optical waveguide layer consists of said at least one core region and said side cladding regions.

15. A method for fabrication of a multilayered optical waveguide structure which includes at least two substrates, at least two optical waveguide layers each having at least one core region and side cladding regions laterally succeeding from the core region, and a cladding layer provided on at least one surface of one of said at least two optical waveguide layers, said one of said at least two optical waveguide layers and said cladding layer being disposed between the substrates, comprising forming a first block comprising one of said at least two substrates, said one of said at least two optical waveguide layers and said cladding layer, said one of said at least two optical waveguide layers or said cladding layer being formed on a face of said substrate;

forming a second block by providing another of said at least two optical waveguide layers on a face of another of said at least two substrates;

stacking said first block and said second block so that the optical waveguide layer or the cladding layer of said first block is brought into direct contact with another face of the substrate of said second block, and heating the resultant stack of the first block and the second block while in such arrangement so that the first block and the second block are bonded together by the optical waveguide layer or cladding layer serving as a bonding layer to form the multilayered structure;

wherein said optical waveguide layer is formed from polysilane composition containing polysilane.

16. The method for fabrication of a multilayered optical waveguide structure as recited in claim 15, characterized in that said side cladding region of the optical waveguide layer and/or said cladding layer is formed as a result of exposure to ultraviolet light that renders the side cladding region and/or the cladding layer lower in refractive index than the unexposed core region.

17. The method for fabrication of a multilayered optical waveguide structure as recited in claim 16, characterized in that, subsequent to formation of said side cladding region, the optical waveguide layer is subjected to a heat treatment.

18. The method for fabrication of a multilayered optical waveguide structure as recited in claim 15, characterized in that said polysilane composition contains polysilane and a silicone compound.

19. The method for fabrication of a multilayered optical waveguide structure as recited in claim 18, characterized in that a blending proportion (polysilane:silicone compound) by mass of said polysilane and said silicone compound is in the range of 5:95-80:20.

20. The method for fabrication of a multilayered optical waveguide structure as recited in claim 18, characterized in that said polysilane composition further contains an organic peroxide.

21. The method for fabrication of a multilayered optical waveguide structure as recited in claim 20, characterized in that said organic peroxide is contained in the amount of 10-30 parts by mass, based on 100 parts by mass of said polysilane and silicone compound.

22. The method for fabrication of a multilayered optical waveguide structure as recited in claim 15, characterized in that, in bonding said first block and said second block into the multilayered structure, they said first block and said second block are heated in the 60-350° C. temperature range.

23. The method for fabrication of a multilayered optical waveguide structure as recited in claim 15, characterized in that, in bonding said first block and said second block into the multilayered structure, said first block and said second block are heated while pressed against each other.

24. The method for fabrication of a multilayered optical waveguide structure as recited in claim 23, characterized in that bonding of said first block and said second block is carried out in a reduced-pressure atmosphere.

25. The method for fabrication of a multilayered optical waveguide structure as recited in claim 23, characterized in that, in bonding said first block and said second block into the multilayered structure, said first block and said second block are pressed at a pressure of 1 kPa-100 MPa.

26. The method for fabrication of a multilayered optical waveguide structure as recited in claim 15, characterized in that said second block comprises an optical waveguide layer.

27. A multilayered optical waveguide structure fabricated by the method as recited in claim 15.

28. The method for fabrication of a multilayered optical waveguide structure as recited in claim 15, wherein said optical waveguide layer consists of said at least one core region and said side cladding regions.

* * * * *